United States Patent [19]

Clark

[11] Patent Number: 5,189,833
[45] Date of Patent: Mar. 2, 1993

[54] TURF-GROWING PROCESS

[75] Inventor: Edward H. Clark, La Mesa, Calif.

[73] Assignee: Conjetta M. Butt, La Mesa, Calif. ; a part interest

[21] Appl. No.: 848,676

[22] Filed: Mar. 9, 1992

[51] Int. Cl.$^5$ ................................................ A01C 1/04
[52] U.S. Cl. ......................................................... 47/56
[58] Field of Search ........................................ 47/56, 9

[56] References Cited

U.S. PATENT DOCUMENTS

| | | | |
|---|---|---|---|
| 3,890,739 | 6/1975 | Blackburn | 47/56 |
| 4,318,248 | 3/1982 | Muldner | 47/56 |
| 4,584,790 | 4/1986 | Gaughen | 47/56 |
| 4,716,679 | 1/1988 | Heard | 47/9 |
| 4,786,308 | 11/1988 | Colling | 47/56 |
| 4,934,094 | 6/1990 | Walton | 47/9 |
| 4,941,282 | 7/1990 | Milstein | 47/58 |
| 4,982,526 | 1/1992 | Miyachi | 47/56 |
| 5,021,285 | 6/1991 | Ohe et al. | 47/28.1 |
| 5,033,231 | 7/1991 | Sakate et al. | 47/56 |

OTHER PUBLICATIONS

Reemay Typar Fabric Brochure-1990.

*Primary Examiner*—David A. Scherbel
*Assistant Examiner*—Michele A. Van Patten
*Attorney, Agent, or Firm*—Henri J. A. Charmasson

[57] ABSTRACT

A process for growing a light-weight, transportable sod-mat and for facilitating the implantation of such a mat on a lawn bed comprises germinating lawn-grass seeds in a thin layer of growing medium spread over a mat of non-woven polypropylene laying on an impermeable membrane. After germination, the mat and the inseminated growing medium is installed over a layer of porous material such as decomposed granite covering a conditioned subsoil. Drip irrigation lines are run through the upper region of the porous material.

12 Claims, 1 Drawing Sheet

TURF-GROWING PROCESS

FIELD OF THE INVENTION

This invention relates to the field of agronomy and more specifically to the growing and transplantation of sod-mats.

BACKGROUND OF THE INVENTION

Transplantable sod is typically grown in heavy soil, then harvested with a machine that cuts a mat approximately 2.5 centimeters (1 inch) thick, 45 centimeters (18 inches) wide and 1.2 meters (48 inches) long. These mats are then stacked on pallets up to a weight of about 1 metric ton (2200 lbs.), then shipped for transplantation over a conditioned top soil where one pallet load will cover approximately 42 square meters (50 square yards).

The successful transplantation of such sod ribbons requires heavy watering and large quantities of fertilizer and other soil amendments.

There have been several attempts in the past to produce less cumbersome sod mats of larger size for easier installation, as exemplified by the disclosure of U.S. Pat. No. 4,982,526 Miyachi. However, in the growing and transportation of sod mats of the prior art, the weight reduction has been traded for a more complex and more labor and time-consuming process.

SUMMARY OF THE INVENTION

The principal and secondary objects of this invention are to provide a simple and rapid process for growing light sod mats which can be cut in long rollable ribbons for easy transportation, then installed in a minimum of time; and to provide a lawn bed for the implantation of such sod mats that favorize rapid growing of a durable turf while requiring minimal irrigation.

These and other valuable objectives are achieved by germinating lawn grass seeds in a thin layer of growing medium sprayed over a mat of non-woven polypropylene lying atop an impermeable membrane. After a few days of germination the mat carrying the inseminated growing medium can be lifted, rolled then spread over a lawn bed where the conditioned top soil lies below an upper porous layer of sand or decomposed granite. Drip irrigation lines are run through the upper region of the sand or decomposed granite layer. Strong growing of roots through the porous layer down to the underlying top soil is favorized by the thermal insulation, moisture retention and minerals admixture provided by the sand or decomposed granite.

Other advantages to the installation of the drip irrigation lines near the top surface of the lawn bed in the granular medium of the porous layer, rather than more deeply into the soil as taught by the prior art, include ease of installation over uneven and steeply sloping areas, quick access for repair or rerouting of the water lines, and avoidance of the drip hole clogging that occurs when the irrigation lines lie in the water saturated substance.

DESCRIPTION OF THE PREFERRED EMBODIMENTS OF THE INVENTION

Figure 1:
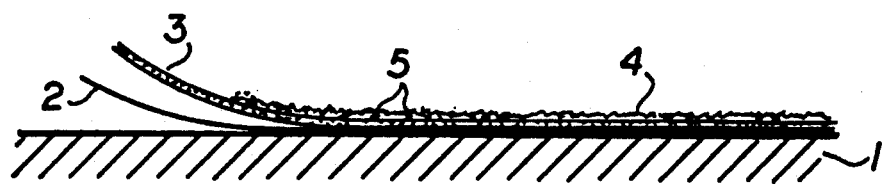
FIG. 1 is a cross-sectional view of the sod mat germination process.

A flat surface 1 outdoors or in an enclosure favorable to vegetation, such as a hot house, is first covered by an impermeable membrane 2. The membrane is preferably a thin black film of polyvinyl.

A porous mat 3 is then placed over the membrane 2. The mat is preferably a slightly porous sheet of non-woven spun bonded polypropylene of the type typically used as a weed barrier in the preparation of lawn beds, as the standard grade T-3201 commercially available under the brand name TYPAR from REEMAY, INC. of Old Hickory, Tenn. Such a polypropylene matting material is characterized by a relative low weight of approximately 60 grams per square meter (1.9 oz. per square yard), a coefficient of permeability of 0.04 centimeter per second and no more than 0.07 centimeter per second measured under ASTM D-4491 protocol, and an A.O.S. equivalent sieve of at least 0.5 millimeter measured under ASTM D-4751 protocol. A growing medium 4 is then spread over the polypropylene mat 3 to a thickness between 3 millimeters (⅛th inch) to 6 millimeters (¼ inch). The growing medium is preferably made of an equal volume of peat moss and paper mulch. Lawn seeds 5 are then disbursed through the growing medium 4. The growing medium is watered and kept moist through germination of the seeds. After germination roots and stalons grow into the polypropylene substrate 3 toward the moisture retained by the membrane 2. After seven to ten days the vegetation is sufficiently implanted into the polypropylene backing 3. The mat consisting of the implanted polypropylene backing 3 and growing medium 4 can be lifted from the membrane 2, rolled and transported for installation on a lawn bed.

It should be noted that the paper mulch, once watered, acts as an agglutinate which greatly contributes to the bonding of the growing medium 4 to the polypropylene substrate 3. The black membrane 2, not only retains the moisture, but further favorizes germination by absorbing heat and reflecting it toward the germinating seeds. The harvested mat can be made or cut to a width of 0.9 meters (3 feet), 1.8 meters (6 feet) or 4.5 meters (15 feet), and to lengths of up to 90 meters (300 feet).

Most significantly the sod mat 6 of the invention is extremely light. It takes only approximately 40 kilos (87 lbs.) of such a sod mat to cover the same area as 1 metric ton (2200 lbs.) of the prior art sod mat. The weight is thus reduced by a factor of 25.

Figure 2:
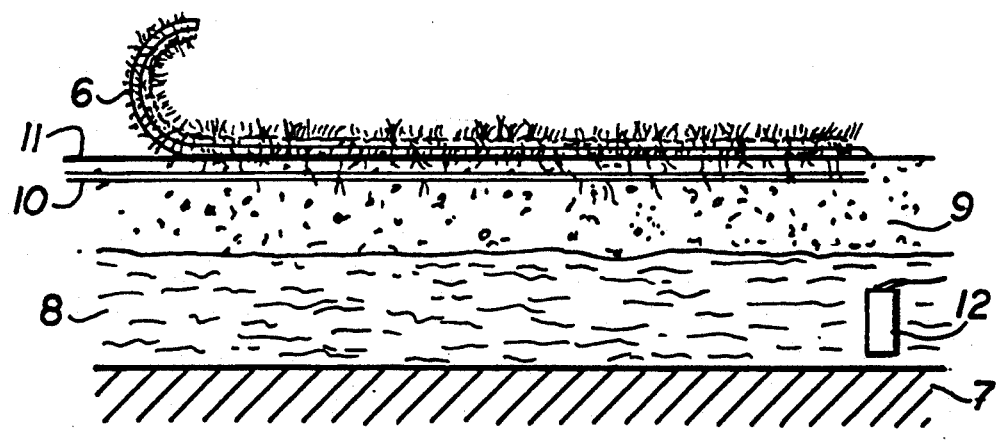
FIG. 2 is a cross-sectional view of the sod mat installed over a lawn bed prepared according to the invention.

As shown in FIG. 2, the sod mat 6 according to the invention can be laid on a lawn bed which is prepared in a manner opposite to the conventional method of placing top soil on the surface and the drainage material underneath. It was found more advantageous to prepare a lawn bed on any type of underground structure 7 by building a layer of top soil or amended soil 8 to a thickness between 15 centimeters (6 inches) to 18 centimeters (8 inches). This soil layer 8 may include water retaining mulch and appropriate fertilizing substances. The top soil layer 8 is then covered by a porous mineral layer 9 made of sand or, preferably, decomposed granite to a thickness between 5 centimeters (2 inches) to 10 centimeters (4 inches). Drip irrigation lines 10 are buried in the upper region of the porous material layer 9 approximately 2.5 centimeters (1 inch) from the top surface 11 of the lawn bed upon which the sod mat 6 is deployed;

in direct departure from the conventional practice of placing the irrigation lines up to 30 centimeters (12 inches), into the subsoil.

The combination of the roots and stolons of the germinated seeds and the porous polypropylene fabric 3 into which they grow gives the sod mat 6 additional strength to stand up to heavy traffic. Due to the reversed layering of the lawn bed, the drip irrigation lines located close to the surface allow the water to trickle down through the porous layer 9 into the top soil layer 8.

It is believed that the electrolysis resulting from the conjunction of the water and the minerals in the sand or decomposed granite create an electromagnetic drawing action of the positive and negative ions in the water, resulting in an even dispersement of the water. The porous layer 9 provides necessary drainage from the surface to the subsurface top soil; serves as a cistern system for the grass roots; provides moisture and nutrients to the subsurface top soil; minimizes the loss of water that is normally due to capillary action and evaporation; allows for strong root penetration into the amended top soil 8; and serves as a thermal insulator for the subsoil. While the resulting lawn requires much less water than conventional lawns, it is recommended that the moisture sensors 12 be buried in the lower top soil layer 8 for a more accurate monitoring of moisture levels.

While the preferred embodiment of the invention has been described, modifications can be made and other embodiments may be devised without departing from the spirit of the invention and the scope of the appended claims.

What is claimed is:

1. A turf-growing process which comprises:
    covering a flat surface with an impermeable membrane;
    placing a porous mat over said membrane;
    spreading a growing medium to a thickness of at least 3 millimeters over said mat;
    inseminating said medium with grass seeds;
    keeping said medium moist through germination of said seeds;
    preparing a lawn bed;
    lifting said mat from said membrane; and
    wherein said step of placing a porous mat comprises selecting a sheet of non-woven spun bonded polymer fiber matting.

2. The process of claim 1, wherein said porous mat is a polypropylene matting having a weight of at least 60 grams per square millimeter.

3. The process of claim 2, wherein said polypropylene matting has a coefficient of permeability of no more than 0.07 centimeter per second.

4. The process of claim 3, wherein said polypropylene matting has a coefficient of permeability of no less than 0.04 centimeter per second.

5. The process of claim 3, wherein said polypropylene matting has a equivalent sieve of no less than 0.5 milimeter.

6. The process of claim 1, wherein the step of spreading a growing medium comprises spreading a mixture of peat moss and paper mulch.

7. The process of claim 1, wherein the step of preparing a lawn bed comprises:
    building a layer of amended soil; and
    piling a stratum of porous minerals atop said layer of amended soil.

8. The process of claim 7, wherein the step of building a layer of amended soil comprises stacking conditioned top soil to a height of at least 15 centimeters.

9. The process of claim 7, wherein the step of preparing a lawn bed further comprises running drip irrigation lines in an upper region of said stratum of porous material.

10. The process of claim 7, wherein the step of piling a stratum of porous material comprises accumulating a layer of sand at least 5 centimeters high.

11. The process of claim 7, wherein the step of piling a stratum of porous material comprises accumulating a layer of decomposed granite at least 5 centimeters high.

12. The process of claim 1, wherein the step of covering a flat surface comprises covering said surface with a black film of polyvinyl.

* * * * *

UNITED STATES PATENT OFFICE
CERTIFICATE OF CORRECTION

PATENT NO. : 5,189,833
DATED : March 2, 1993
INVENTOR(S) : Edward H. Clark

It is certified that error appears in the above-identified patent and that said Letters Patent is hereby corrected as shown below:

In Claim 1, column 4, line 4 before the semicolon add:

--, laying said mat over said lawn bed--.

In Claim 2, column 4, line 10, replace "millimeter" with

--meter--.

Signed and Sealed this

Ninth Day of August, 1994

Attest:

BRUCE LEHMAN

*Attesting Officer*  *Commissioner of Patents and Trademarks*